US011125630B2

(12) United States Patent
Samson et al.

(10) Patent No.: US 11,125,630 B2
(45) Date of Patent: Sep. 21, 2021

(54) THERMOMETRIC MEASUREMENT BY MESHING OF PROBES, PARTICULARLY IN TURBINE ENGINES

(71) Applicant: SAFRAN HELICOPTER ENGINES, Bordes (FR)

(72) Inventors: Rafaël Samson, Moissy-Cramayel (FR); Antoine Pascal Moutaux, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 167 days.

(21) Appl. No.: 16/489,162

(22) PCT Filed: Feb. 28, 2018

(86) PCT No.: PCT/FR2018/050471
§ 371 (c)(1),
(2) Date: Aug. 27, 2019

(87) PCT Pub. No.: WO2018/158541
PCT Pub. Date: Sep. 7, 2018

(65) Prior Publication Data
US 2019/0383669 A1 Dec. 19, 2019

(30) Foreign Application Priority Data
Feb. 28, 2017 (FR) ........................... 1751644

(51) Int. Cl.
*G01K 7/00* (2006.01)
*G01K 1/00* (2006.01)
(Continued)

(52) U.S. Cl.
CPC ............ *G01K 7/021* (2013.01); *G01K 7/026* (2013.01); *G01K 13/02* (2013.01); *G01K 13/024* (2021.01);
(Continued)

(58) Field of Classification Search
USPC .................... 374/179, 148, 166, 208, 144
See application file for complete search history.

(56) References Cited

U.S. PATENT DOCUMENTS 3,472,068 A * 10/1969 List .................. G01K 7/021
73/114.69
3,618,386 A * 11/1971 Black .................. G01K 11/22
374/115
(Continued)

FOREIGN PATENT DOCUMENTS

EP 0 878 851 A2 11/1998
EP 0 878 851 A3 9/2000
(Continued)

OTHER PUBLICATIONS

French Preliminary Search Report dated Sep. 28, 2017 issued by the French Intellectual Property Office in counterpart French Application No. 1751644.
(Continued)

*Primary Examiner* — Mirellys Jagan
(74) *Attorney, Agent, or Firm* — Sughrue Mion, PLLC (57) ABSTRACT

The invention relates to a temperature measurement device comprising at least three probes, a computer, the computer being configured to estimate a temperature on the basis of voltage measurements at the output of the probes, characterised in that the probes are connected together in a plurality of meshes mounted in series, with at least one mesh comprising at least two probes mounted in parallel and at least one other mesh comprising a probe or a plurality of probes mounted in parallel.

9 Claims, 8 Drawing Sheets

(51) Int. Cl.
*G01K 13/00* (2021.01)
*G01K 7/02* (2021.01)
*G01K 7/026* (2021.01)
*G01K 13/02* (2021.01)
*G01K 13/024* (2021.01)

(52) U.S. Cl.
CPC ..... *G01K 2205/00* (2013.01); *G01K 2213/00* (2013.01)

(56) References Cited

U.S. PATENT DOCUMENTS

| | | | | |
|---|---|---|---|---|
| 6,425,687 | B1* | 7/2002 | Kulczyk | G01K 3/06 374/115 |
| 7,862,231 | B2* | 1/2011 | Liu | G01K 7/12 374/141 |
| 8,485,724 | B2* | 7/2013 | Aberra | G01K 7/14 374/181 |
| 9,176,010 | B2* | 11/2015 | Reich | G01K 7/021 |
| 2005/0259719 | A1* | 11/2005 | Phillips | G01K 7/04 374/179 |
| 2008/0291964 | A1* | 11/2008 | Shrimpling | G01K 3/10 374/1 |

FOREIGN PATENT DOCUMENTS

| | | |
|---|---|---|
| FR | 1 138 404 A | 6/1957 |
| FR | 3 023 415 A1 | 1/2016 |
| WO | 2016/055726 A1 | 4/2016 |

OTHER PUBLICATIONS

International Search Report for PCT/FR2018/050471 dated Apr. 23, 2018 [PCT/ISA/210].

* cited by examiner

THERMOMETRIC MEASUREMENT BY MESHING OF PROBES, PARTICULARLY IN TURBINE ENGINES

GENERAL TECHNICAL FIELD AND PRIOR ART

The invention relates to temperature measurement, particularly within turboprops.

Within turboprops, the temperature of gases in the turbines can exceed a thousand degrees.

Temperature measurements are accomplished there by means of thermocouple probes which offer the advantage of having very wide continuous measurement ranges.

The operation of a thermocouple probe is based on the exploitation of the Seebeck effect: a potential difference is generated by thermoelectric effect between two junction points of conductors of different types subjected to a temperature difference.

Conventionally, a thermocouple probe has three types of conductors:

two conductors of different types constitute together the thermoelectric couple; these two conductors are welded at one point, which is intended to be immersed in the medium of which it is desired to determine the temperature, this weld being conventionally called a hot weld;

two conductor leads of the same type conventionally constitute the electrical interface; one lead is welded to one of the conductors of the thermoelectric couple and another is welded to the second conductor of the thermoelectric couple, these welds being conventionally called cold welds.

The temperature difference between the hot weld and the cold welds generates a potential difference, which is measured between the two cold welds of the thermocouple.

This measurement principle has, however, the disadvantage of delivering low voltage levels, which generates difficulties during acquisition of the signal by the computer, particularly due to the influence of electromagnetic fields which perturb the measurement.

There exists therefore a need for a temperature measurement solution allowing an increase in the signal level leaving the sensor, so as to favor acquisition, while simplifying the construction of the input stages of the computer and reducing the costs of production.

Already proposed in the prior art is the series connection of two or more thermocouple probes. The association of thermocouples in series allows increasing voltage levels fairly simply allowing acquisition to be accomplished. However, the loss of a thermocouple causes the loss of a complete measurement branch. This solution improves fault detection but can reduce the availability rate of the machine.

The use of thermoelectric couples having a higher Seebeck coefficient can also allow an increase in the output voltage levels of the probe. The couple currently used is of a type called K, or chromel-alumel. Couples considered are type E, or chromel (nickel+chromium alloy)-constantan (nickel+copper alloy), type J, or iron-constantan, and type N, or Nisil (nickel+silicon alloy)-Nicrosil (nickel+chromium+silicon alloy). Certain constraints are present, however; in fact a given thermoelectric couple can have a more limited operating range, types E and J having a continuous range of 800° C. and 720° C. respectively, compared with the 1100° C. of type K. Moreover, type J is not suited for use in an oxidizing and humid environment.

It is also possible to amplify the voltages levels as close to the probe as possible, thus avoiding making low-level signals travel over long distances, this solution having been considered but making measurement more complex.

GENERAL PRESENTATION OF THE INVENTION

One aim of the invention is to increase the output voltage level of the thermometric measurement device.

Another aim is to increase the operating reliability of the thermometric measurement system.

Another aim is to increase the availability of the thermometric measurement system.

Another aim is to improve the detection of faults in the thermometric measurement system.

According to one aspect, the invention proposes temperature measurement device including at least three temperature probes, a computer, the computer being configured to estimate a temperature on the basis of voltage measurements at the output of the probes, characterized in that the probes are connected together in a plurality of lattices assembled in series, at least one lattice including at least two probes assembled in parallel and at least one other lattice including one probe or a plurality of probes assembled in parallel.

A device of this type is advantageously completed by the various following features, taken alone or in combination:

At least one temperature probe is a thermocouple;

At least one probe includes a plurality of thermocouples;

two lattices in series each include at least one thermocouple, two thermocouples of said lattices being assembled in series and the cold weld between a connecting conductor and a conductor of a first type of the thermoelectric couple of a first thermocouple is connected in an equipotential manner to the cold weld between a connecting conductor and a conductor of a second type of the thermoelectric couple of the other thermocouple, so as to add the electromotive forces of the two thermocouples;

the device includes at least two thermocouples assembled in parallel and the cold welds on the conductors of the same type of the thermoelectric couples of the two thermocouples are connected in an equipotential manner, the two thermocouples thus having the same potential difference;

the cold welds of the thermocouples of the various lattices are contained in an isothermal connection housing;

it includes a plurality of probes each including at least two thermocouples, thermocouples of the different probes being connected together to define two measurement paths, each measurement path including a plurality of lattices assembled in series, among which
  at least one lattice includes at least two probes assembled in parallel and
  at least one other lattice includes a probe or a plurality of probes assembled in parallel,
the wiring of the paths being configured so that at least one probe comprises a thermocouple assembled in a first lattice on one path and a second thermocouple assembled in a second lattice on the other path.

According to another aspect, the invention proposes an industrial machine including a temperature measurement device of this type.

According to another aspect, the invention proposes a turbine engine including a temperature measurement device of this type.

PRESENTATION OF THE FIGURES

Other features and advantages of the invention will be revealed by the description that follows, which is purely

DESCRIPTION OF ONE OR MORE METHODS OF OPERATION AND EMBODIMENTS

The temperature measuring device consists of an assembly of thermocouple probes 1, 2, 3, and 4 in an electrical circuit 5 connected at its terminals 6 to a computer 7 converting the voltage U noted into a temperature difference between the cold welds of the thermocouples and their hot welds, the assembly associating in series lattices 57, 58, each of the lattices including thermocouples 10, 20 and 30, 40 assembled in parallel.

It is understood that the examples discussed hereafter are purely illustrative and not limiting, the device described being able to include a different number of lattices, of probes and of thermocouples than the examples described.

Installation Example of the Temperature Measurement Device

Figure 1:
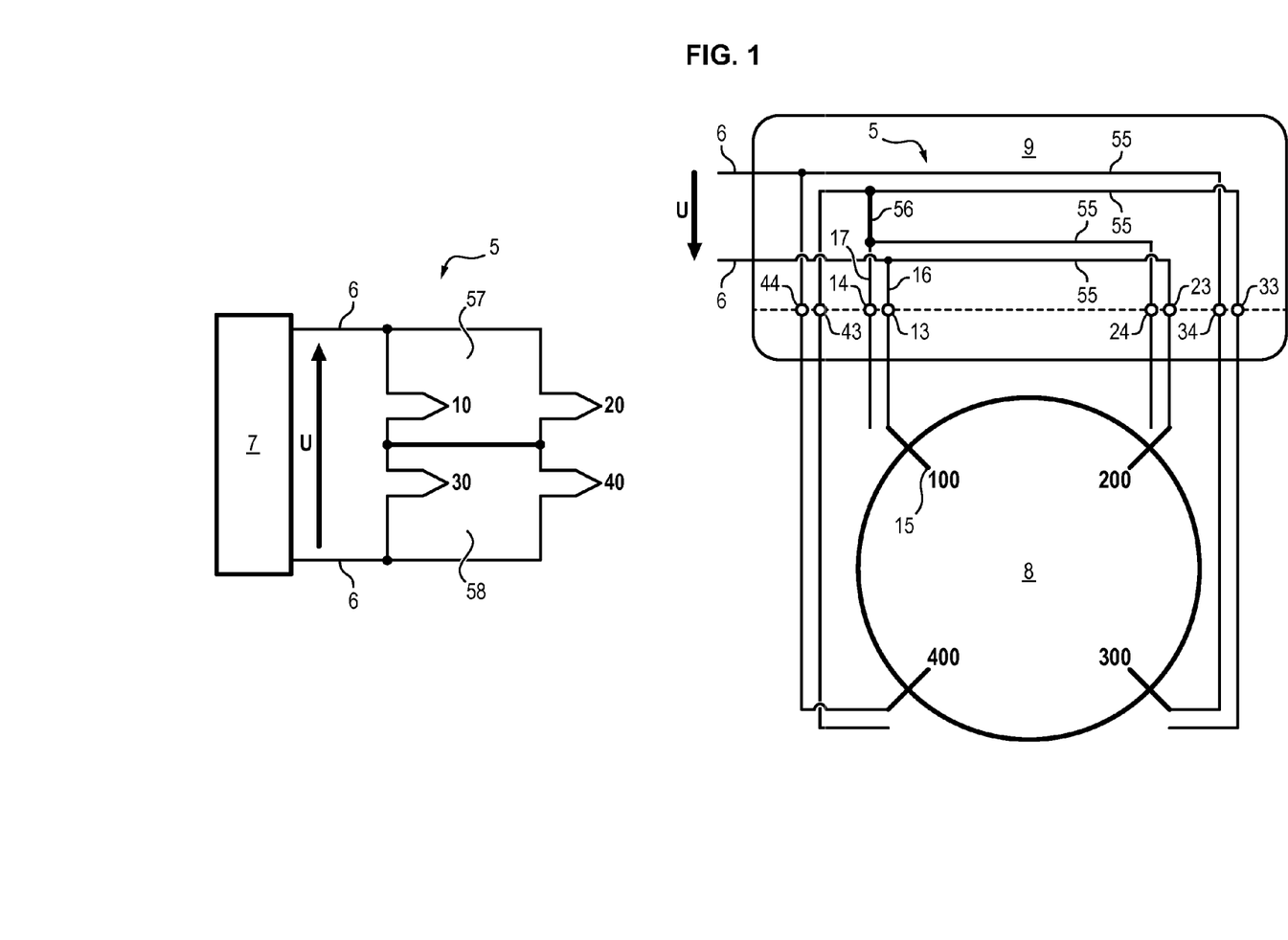
FIG. 1 is a schematic representation of the installation of the probes in the thermometric measurement device and the associated electrical assembly for a configuration including 4 probes.

With reference to FIG. 1, an installation schematic corresponding to an assembly including 4 thermocouple probes 100, 200, 300, 400 is shown.

The probes are installed in an inter-turbine section 8 and connected to a junction housing 9.

The probes are integrated into the inter-turbine section 8 on its perimeter, at its wall in the same plane orthogonal to the gas circulation direction.

A thermocouple 10 includes a junction of a first type 13, i.e. a weld between a first conductor of the thermoelectric couple and a lead of the electrical interface conductor 16, a junction of a second type 14 between the second conductor of the thermoelectric couple and another lead of the electrical connecting conductor 17, and a hot weld 15 at the contact point of the conductors of the thermoelectric couple.

Junctions of the first and second type, i.e. the cold welds of the thermocouples, are all situated in the junction housing 9 and must be maintained at the same temperature to avoid generating a parasitic electromotive force.

The junction housing 9 is therefore a thermally controlled isothermal housing, similar to a housing described in patent application FR3027106.

The internal resistance of the circuit increasing with the length of the cable, it is necessary that the leads placed in parallel have the same lengths to avoid biasing the average local electromotive forces. The leads of certain thermocouples will therefore be folded over to have the same cable length for each thermocouple at the input of the junction housing 9 and of the computer 7.

The association in series and parallel of the thermocouples 10, 20, 30, 40 is accomplished by copper connections 55 in the junction housing 9. This allows a reduction in the cost of production of the thermocouple harness by accomplishing the junctions in a housing that is offset or downstream of the base of the harness.

The assembly accomplished in the junction housing 9 includes assembling together the junctions of the first type 13 and 23 of the thermocouples 10 and 20 and assembling together the junctions of the second type 34 and 44 of the probes 30 and 40, these two poles then being connected to the output of the junction housing 9.

The equipotential connection 56 of the junctions of the second type 14 and 24 of the thermocouples 10 and 20 and of the junctions of the first type 33 and 43 of the thermocouples 30 and 40 is then accomplished, thus forming a series connection of the two lattices 57 and 58, the lattice 57 including the thermocouples 10 and 20 associated in parallel and the lattice 58 including the thermocouples 30 and 40 associated in parallel.

The computer 7 is connected to the terminals of the junction housing 9, and converts the measured voltage U into a difference in temperature between the inter-turbine section 8 and the junction housing 9, the temperature of the junction housing 9 being assessed by a temperature probe.

The computer 7 then establishes the intra-turbine gas temperature by adding the difference in temperature between the hot weld and the cold welds to the temperature of the cold welds.

In one of the forms of the temperature measurement device, the probes include two thermocouples 10, 11 per sleeve thus allowing two temperature measurement paths to be achieved.

Integration of the Probes in the Turbine

Figure 2:
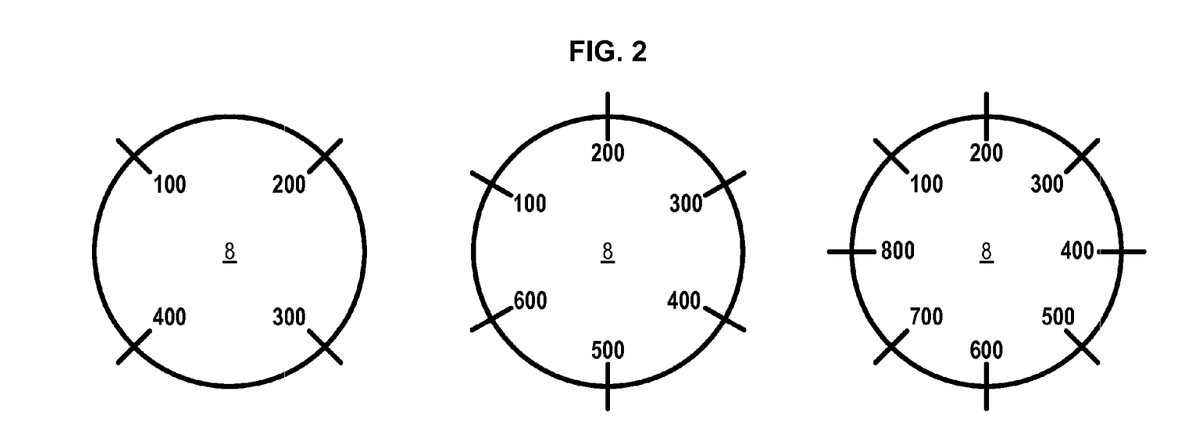
FIG. 2 shows the installation of probes in a plane of the interturbine section according to configurations including different numbers of probes.

Referring to FIG. 2, different solutions for arranging thermocouple probes on a plane of the turboprop are suitable for achieving the temperature measurement device.

A first solution includes 4 thermocouple probes 100, 200, 300, 400 disposed in a circle at 90° from one another.

A second solution includes 6 thermocouple probes 100, 200, 300, 400, 500, 600 disposed in a circle at 60° from one another.

Another solution includes 8 thermocouple probes 100, 200, 300, 400, 500, 600, 700, 800 disposed in a circle at 45° from one another.

Assembly with 4 Dual Thermocouple Probes

One embodiment of the temperature measurement device consists of assembling 4 dual thermocouple probes to form two measurement paths.

Each measurement path therefore comprises an assembly including one thermocouple from each dual probe, the thermocouples of one path being assembled electrically according to a circuit including a series connection of two lattices consisting of two thermocouples assembled in parallel.

Figure 3:
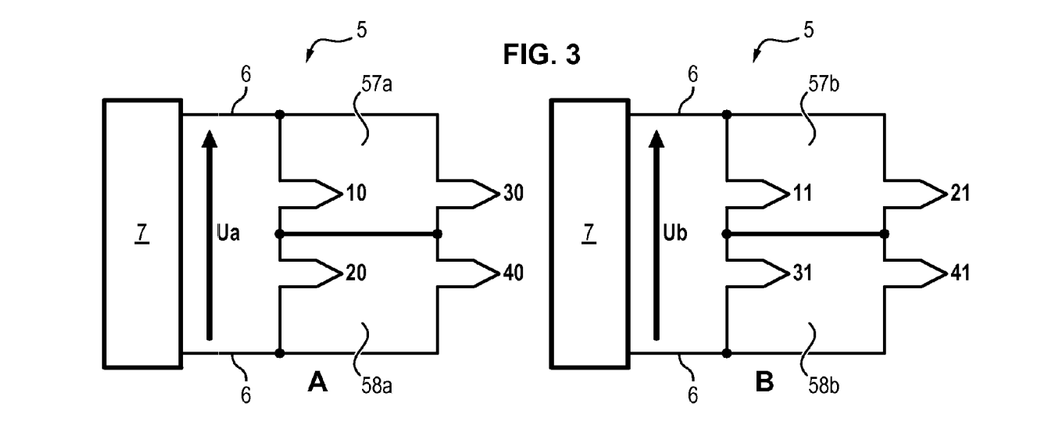
FIG. 3 shows the electrical assembly of the two measurement paths in a configuration including 4 probes with two thermocouples each.

Referring to FIG. 3, within the scope of an adopted solution including 4 thermocouples 100, 200, 300 and 400, one embodiment of the temperature measurement device includes two different wirings for the two measurement paths A and B. Path A for example includes a series association of two lattices 57a and 58a, a first lattice 57a consisting of the thermocouples 10 and 30 assembled in parallel and a second lattice 58a composed of the thermocouples 20 and 40 assembled in parallel. Path B, for its part, includes a series association of two lattices 57b and 58b, a first lattice 57b composed of the thermocouples 11 and 21 assembled in parallel and a second lattice 58b composed of thermocouples 31 and 41 assembled in parallel.

Each measurement path is connected independently of the other to the computer, which therefore measures their voltages Ua (path A) and Ub (path B), which are homogeneous in the case of normal operation because the thermocouples composing the measurement paths A and B are disposed at the same azimuths.

Figure 4:
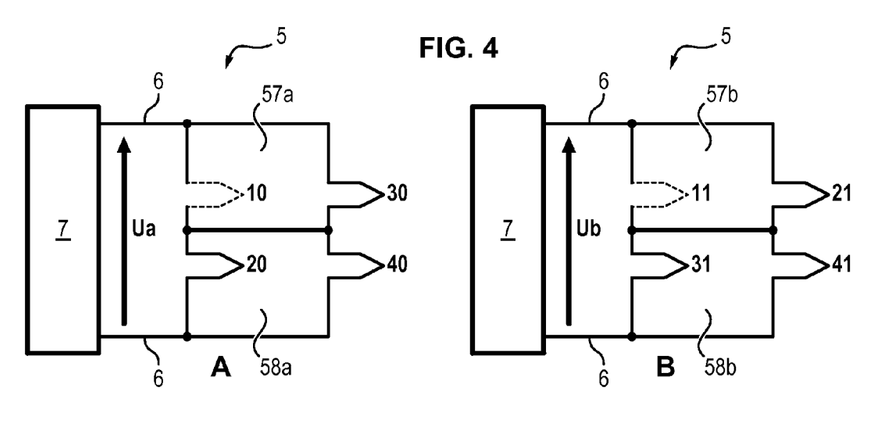
FIG. 4 shows the electrical assembly of the two measurement paths in a configuration including 4 probes with two thermocouples each, in an operating case where probe 1 is damaged.

Referring to FIG. 4, this embodiment ensures, in the event of degradation of a probe that information and accuracy will not be lost on both measurement paths simultaneously. In the event of loss of the probe 100, for example, the thermocouples 10 and 11 are considered to be an opening in the circuit on paths A and B, which does not result in a significant loss of accuracy. The voltage U supplied to the computer 7 remains within the same order of magnitude, namely the sum of the electromotive forces of two thermocouples.

Figure 5:
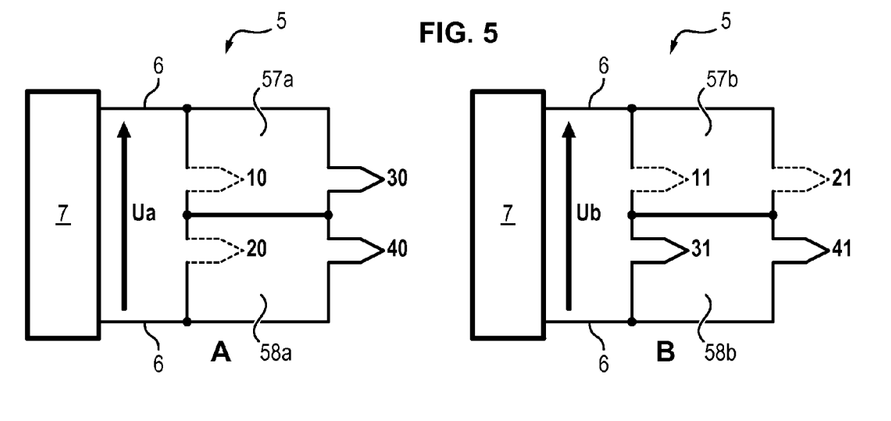
FIG. 5 shows the electrical assembly of the two measurement paths in a configuration including 4 probes with two thermocouples each, in an operating case where probes 1 and 2 are damaged.

Referring to FIG. 5, in the event of the deterioration of a second probe, one of the paths remains operational. In this example, the probe 200 is also damaged. The thermocouples 20 and 21 are considered to be openings in their respective measurement paths. The information is lost in path B, but remains available and of the same order of magnitude in path A, i.e. the sum of the electromagnetic forces of thermocouples 30 and 40.

In addition to increasing the measurement voltage U at the terminals of the assembly, this type of construction allows retaining the availability of measurements over at least one of the paths in the event of a simple or double failure and detecting an anomaly in the event of loss of one of the paths.

Assembly with 5 Dual Thermocouple Probes

Figure 6:
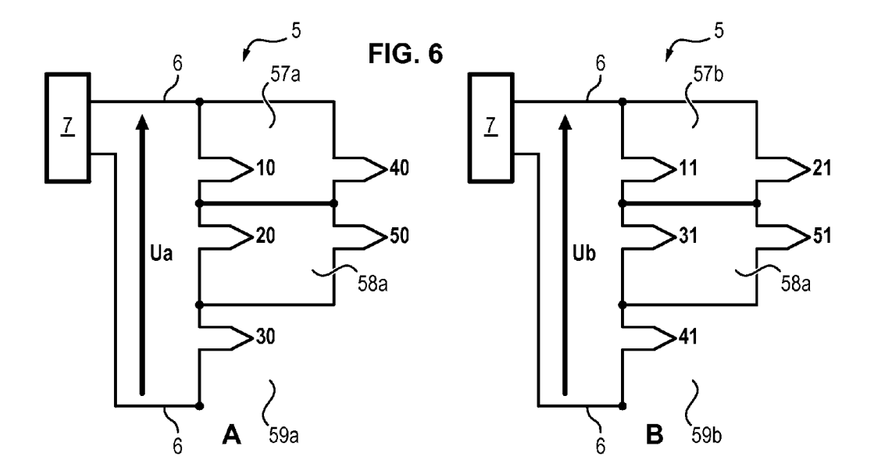
FIG. 6 shows a configuration of the electrical assembly of the two measurement paths in a configuration including 5 probes with two thermocouples each.
Figure 7:
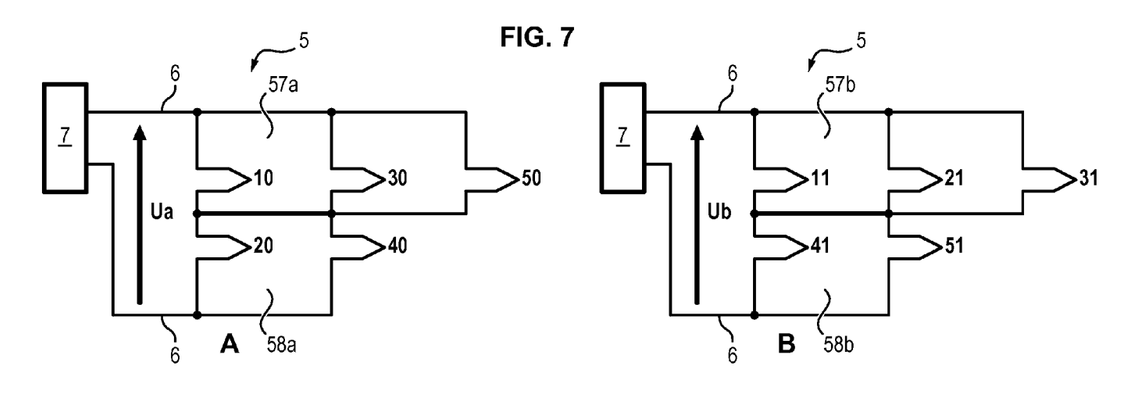
FIG. 7 shows a second configuration of the electrical assembly of the two measurement paths in a configuration including 5 probes with two thermocouples each.

Referring to FIGS. 6 and 7, the assembly of 5 dual thermocouple probes can be achieved in two different manners.

One embodiment of the temperature measurement device, shown in FIG. 6, favors the increase in the measurement voltage U. In path A, the probes are wired so as to accomplish an assembly composed of the series connection of three lattices, a first lattice 57a composed of thermocouples 10 and 40 assembled in parallel, a second lattice 58a composed of thermocouples 20 and 50 assembled in parallel, and a third lattice 59a including the thermocouple 30. In path B, the probes are wired so as to accomplish an assembly composed of the series connection of three lattices, a first lattice 57b composed of thermocouples 11 and 21 assembled in parallel, a second lattice 58b composed of thermocouples 31 and 51 assembled in parallel and a third lattice 59b including the thermocouple 41.

In addition to increasing the measurement voltage U, this embodiment allows retaining the measurement over at least one of the paths in the event of a simple or double failure, in addition to allowing the detection of an anomaly through the loss of one of the paths if the probe 300 or 400 is damaged.

Another embodiment of the temperature measurement device, shown in FIG. 7, favors the availability of the measurement system. In path A, the probes are wired so as to accomplish an assembly composed of the series connection of two lattices, a first lattice 57a composed of probes 10 and 30 and 50 assembled in parallel, a second lattice 58a composed of probes 20 and 40 assembled in parallel. In path B, the probes are wired so as to accomplish an assembly composed of the series connection of two lattices, a first lattice 57b composed of probes 11 and 21 and 31 assembled in parallel, a second lattice 58b composed of probes 41 and 51 assembled in parallel.

This embodiment allows guaranteeing the operation of at least one of the measurement paths even in the case of a triple failure. The deterioration of probes 200 and 400 makes path A inoperable and reveals a fault just as the deterioration of probes 400 and 500 makes path B inoperable and therefore allows a fault to be detected.

Assembly with 6 Dual Thermocouple Probes

Figure 8:
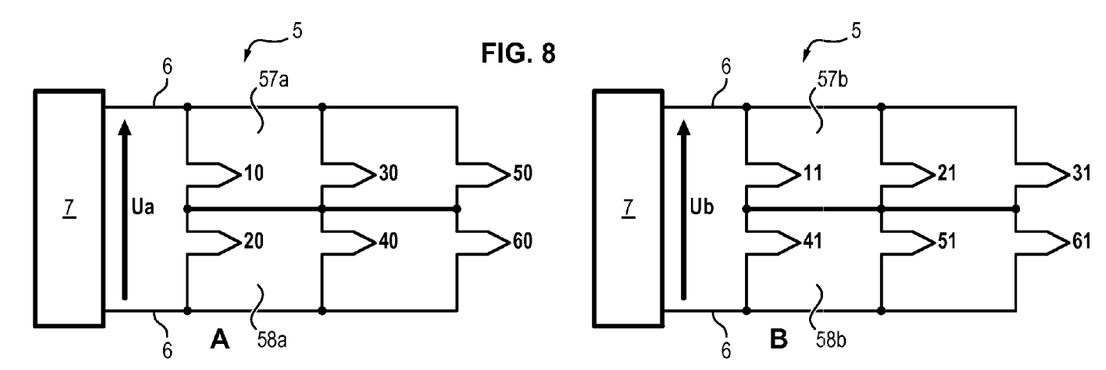
FIG. 8 shows a configuration of the electrical assembly of the two measurement paths in a configuration including 6 probes with two thermocouples each.

Referring to FIG. 8, one embodiment of the temperature measurement device includes 6 dual thermocouple probes, the assembly of which favors availability to the detriment of fault detection and increasing the measurement voltage.

Path A includes a series connection of two lattices, a first lattice 57a composed of thermocouples 10, 30 and 50 assembled in parallel and a second lattice 58a composed of thermocouples 20, 40 and 60 assembled in parallel. Path B includes a series connection of two lattices, a first lattice 57b composed of thermocouples 11, 21 and 31 assembled in parallel and a second lattice 58b composed of thermocouples 41, 51 and 61 assembled in parallel.

Figure 9:
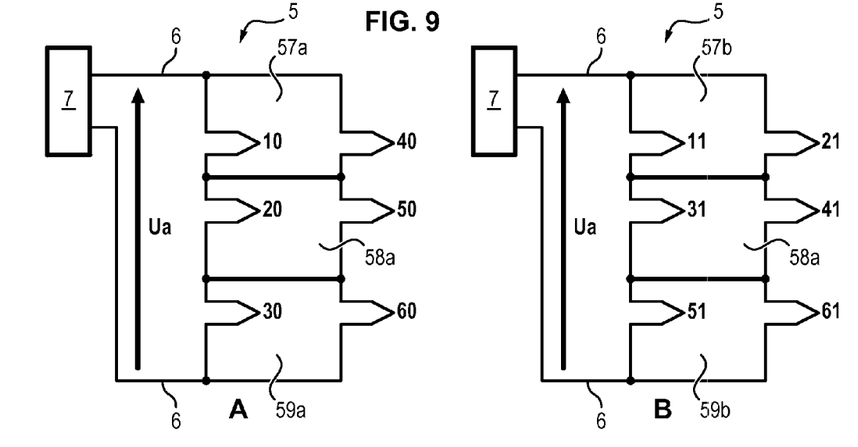
FIG. 9 shows a second configuration of the electrical assembly of the two measurement paths in a configuration including 6 probes with two thermocouples each.

Referring to FIG. 9, one embodiment of the temperature measurement device includes 6 dual thermocouple probes, the assembly of which favors the increase of measurement voltage U and fault detection, a double failure being able to cause the loss of one of the paths.

Path A includes a series connection of three lattices, a first lattice 57a composed of thermocouples 10 and 40 assembled in parallel, a second lattice 58a composed of thermocouples 20 and 50 assembled in parallel and a third lattice 59a composed of thermocouples 30 and 60 assembled in parallel. Path B includes a series connection of three lattices, a first lattice 57b composed of thermocouples 11 and 21 assembled in parallel, a second lattice 58b composed of thermocouples 31 and 41 assembled in parallel and a third lattice 59b composed of thermocouples 51 and 61 assembled in parallel.

Figure 10:
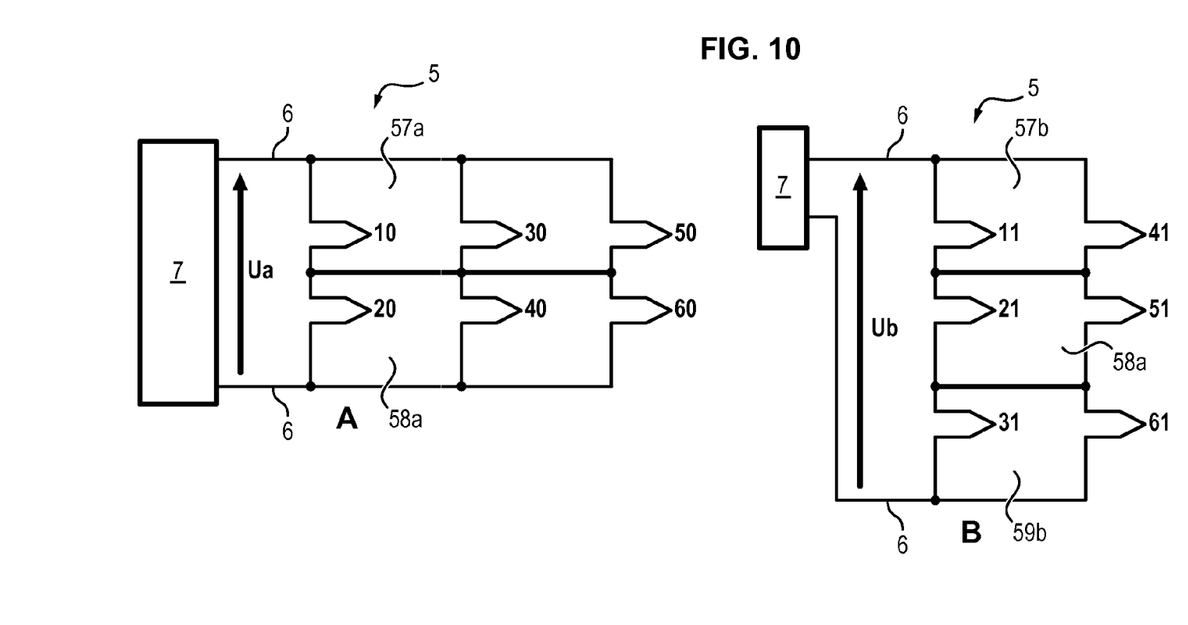
FIG. 10 shows a third configuration of the electrical assembly of the two measurement paths in a configuration including 6 probes with two thermocouples each.

Referring to FIG. 10, one embodiment of the temperature measurement device includes, in its path A, an assembly favoring availability and, in its path B, an assembly favoring fault detection and the measurement voltage U. Path A therefore includes a series connection of two lattices, a first lattice 57a composed of thermocouples 10, 30 and 50 mounted in parallel and a second lattice 57b composed of thermocouples 20, 40 and 60 mounted in parallel. Path B includes a series connection of three lattices, a first lattice 57b composed of thermocouples 11 and 41 assembled in parallel, a second lattice 58b composed of thermocouples 21 and 51 assembled in parallel and a third lattice 59b composed of thermocouples 31 and 61 assembled in parallel.

Figure 11:
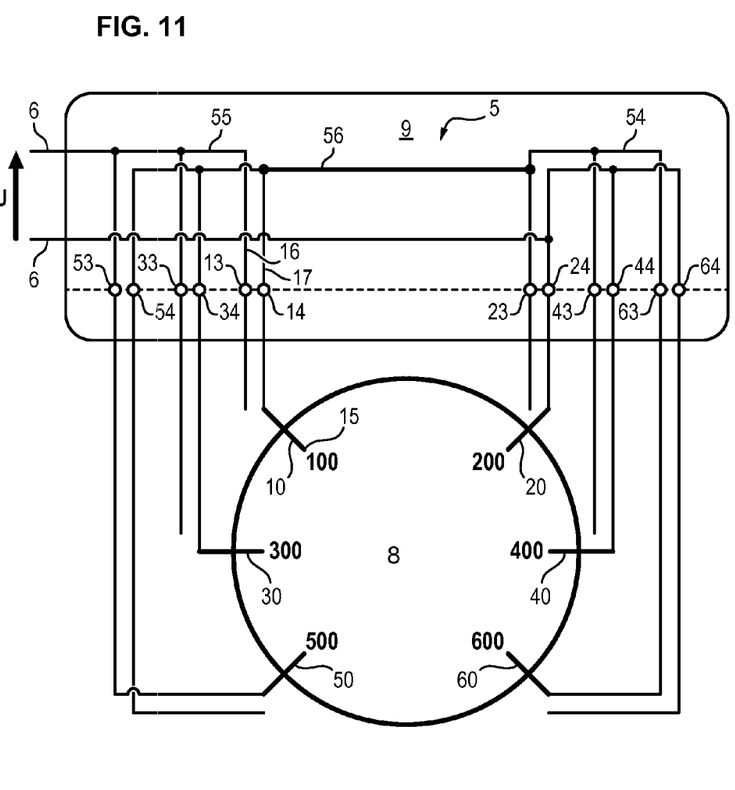
FIG. 11 is a schematic representation of the installation of the probes in the thermometric measurement device and the associated electrical assembly for a configuration including 6 probes.

Referring to FIG. 11, an installation schematic corresponding to an assembly including 6 thermocouple probes 100, 200, 300, 400, 500, 600 is shown.

The probes are installed in an inter-turbine section 8 and connected to a junction housing 9.

The probes are integrated into the inter-turbine section 8 on its periphery, at its wall in a same plane orthogonal to the gas circulation direction.

A thermocouple 10 includes a junction of a first type 13, namely a weld between the conductor of a first type of the thermoelectric couple and a lead of the electrical interface conductor 16, a junction of the second type 14 between the conductor of the second type of the thermoelectric couple and another lead of the electrical connecting conductor 17, and a hot weld 15 at the contact point of the conductors of the thermoelectric couple.

The junctions of the first and second type, the cold welds of the thermocouples, are all situated in the junction housing 9.

The association in series and parallel of thermocouples 10, 20, 30, 40, 50 and 60 is accomplished by copper connections 55 in the junction housing 9.

The assembly accomplished in the junction housing 9 includes assembling together junctions of the first type 13, 33 and 53 of thermocouples 10, 30 and 50 and junctions of the second type 24, 44 and 64 of the probes 20, 40 and 60, these two poles then being connected to the output of the junction housing 9.

The equipotential connection 56 of junctions of the second type 14, 34 and 54 of thermocouples 10, 30 and 50 and of junctions of the first type 23, 43 and 63 of thermocouples 20, 40 and 60 is then accomplished, thus forming a series connection of two lattices 57 and 58, the lattice 57 including thermocouples 10, 30 and 50 associated in parallel and the lattice 58 including thermocouples 20, 40 and 60 associated in parallel.

The computer 7 is connected to the terminals of the junction housing 9, and converts the measured voltage U into a temperature difference between the inter-turbine section 8 and the junction housing 9, the temperature of the junction housing 9 being assessed by a temperature probe.

Figure 12:
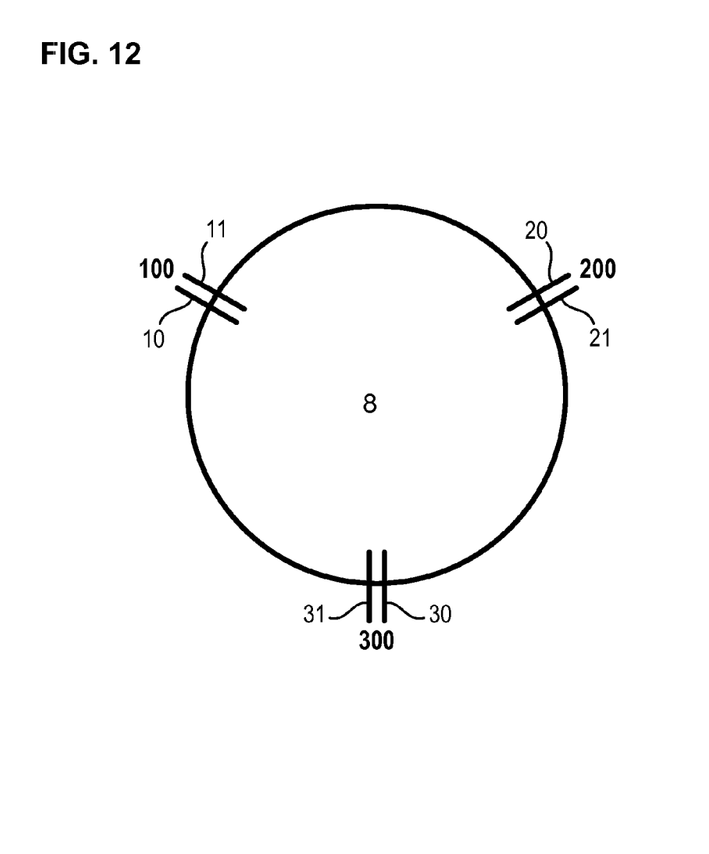
FIG. 12 is a schematic representation of the installation of probes with dual thermocouples in the thermometric measurement device and the assembly of the associated two measurement paths for a configuration including 3 probes.

Referring to FIG. 12, a minimal configuration of the system includes three dual-thermocouple probes.

The two measurement paths A and B each includes two lattices 57 and 58 assembled in series to satisfy the criterion of increasing the output voltage level.

The lattice 57 includes two thermocouples assembled in parallel to satisfy the criterion of system availability and the lattice 58 includes one thermocouple, satisfying the criterion of fault detection.

In path A, the lattice 57a includes thermocouples 10 and 20 of probes 1 and 2, the lattice 58a including the thermocouple 30 of probe 3.

In path B, the lattice 57b includes thermocouples 11 and 31 of probes 1 and 3, the lattice 58b including the thermocouple 21 of probe 2.

This association of probes in different lattices depending on the measurement path allows the satisfaction of the criteria of reliability of the system, the loss of a probe causing the loss of a single measurement path, the second measurement path remaining functional.

In embodiments not discussed in detail, integrating probes including a different number of thermocouples, it would be possible to achieve a different number of measurement paths.

The invention claimed is:

1. A temperature measurement device including at least three temperature probes, a computer, the computer being configured to estimate a temperature on a basis of voltage measurements at an output of the temperature probes, wherein the temperature probes are connected to one another in a plurality of lattices assembled in series, at least one lattice including at least two temperature probes assembled in parallel and at least one other lattice including another temperature probe or a plurality of other temperature probes assembled in parallel.

2. The temperature measurement device according to claim 1, wherein at least one temperature probe includes a plurality of thermocouples.

3. The temperature measurement device according to claim 2, including a plurality of temperature probes each comprising at least two thermocouples, the thermocouples of the temperature probes being connected to one another to define two measurement paths, each measurement path including a plurality of lattices assembled in series, in which
   i. at least one lattice includes at least two temperature probes assembled in parallel; and
   ii. at least one other lattice includes one temperature probe or a plurality of temperature probes assembled in parallel; the wiring of the measurement paths being configured so that at least one temperature probe comprises a thermocouple assembled in a first lattice on one measurement path and a second thermocouple assembled in a second lattice on the other measurement path.

4. A temperature measurement device as defined by claim 1, wherein at least one temperature probe is a thermocouple.

5. The temperature measurement device according to claim 4, including at least two thermocouples assembled in parallel and cold welds on conductors of a same type of thermoelectric couples of the two thermocouples are connected in an equipotential manner, the two thermocouples thus having a same potential difference.

6. The temperature measurement device according to claim 4, wherein two lattices in series each include at least one thermocouple, a first thermocouple and a second thermocouple of said lattices being assembled in series, and wherein a cold weld between a connecting conductor and a conductor of a first type of a thermoelectric couple of the first thermocouple is connected in an equipotential manner to another cold weld between a connecting conductor and a conductor of a second type of a thermoelectric couple of the second thermocouple, so as to add electromotive forces of the first and second thermocouples.

7. The temperature measurement device according to claim 6, wherein the cold welds of the thermocouples of the plurality of lattices are contained in an isothermal connection housing.

8. An industrial machine including at least one temperature measurement device as defined in claim 1.

9. A turbine engine including at least one temperature measurement device as defined in claim 1.

* * * * *